United States Patent [19]

Gella

[11] 4,249,757
[45] Feb. 10, 1981

[54] ART AND EDUCATIONAL BOOK

[76] Inventor: Teresa M. Gella, 328 Beard Ave., Buffalo, N.Y. 14214

[21] Appl. No.: 963,041

[22] Filed: Nov. 22, 1978

[51] Int. Cl.³ .............................................. B42D 1/00
[52] U.S. Cl. ................................. 281/15 R; 283/63 R
[58] Field of Search ............. 281/15 R, 42; 283/63 R

[56] References Cited

U.S. PATENT DOCUMENTS

| 1,011,833 | 12/1911 | Newell | 283/63 R |
|---|---|---|---|
| 1,028,921 | 6/1912 | Wagner | 283/63 R |
| 1,528,621 | 3/1925 | Lavers | 281/15 R X |
| 2,318,949 | 5/1943 | Kroner | 281/15 R X |
| 2,689,751 | 9/1954 | Baller | 281/15 R X |
| 2,740,231 | 4/1956 | Baller | 281/15 R |
| 3,191,319 | 6/1965 | Waisgerber | 283/63 R X |
| 3,294,424 | 12/1966 | Mathews | 281/15 R X |
| 3,753,581 | 8/1973 | Kamstra | 283/63 R X |

FOREIGN PATENT DOCUMENTS 1074505  10/1954  France .................................. 283/63 R Primary Examiner—Paul A. Bell Attorney, Agent, or Firm—Christel, Bean & Linihan

[57] ABSTRACT

An education and art book comprising a first page, a last page and a plurality of additional pages in between. Components of graphical information such as words or pictorial illustration are fixed to the rear surface of the first page and to the front surface of the last page. Openings are provided in the additional pages through which the components on the first or last pages are visible to the reader depending upon the position to which the additional pages are moved. Additional components of graphical information are provided on the additional pages and located relative to the openings so as to combine with the components on the first or last pages to convey to the reader a graphical message such as a completed sentence or pictorial illustration. In other book embodiments, the additional pages can have other openings and components of graphical information which combine sequentially as the pages are moved sequentially. The book provides a new way of reading and finds use in the areas of education, art and semiotic research.

2 Claims, 10 Drawing Figures

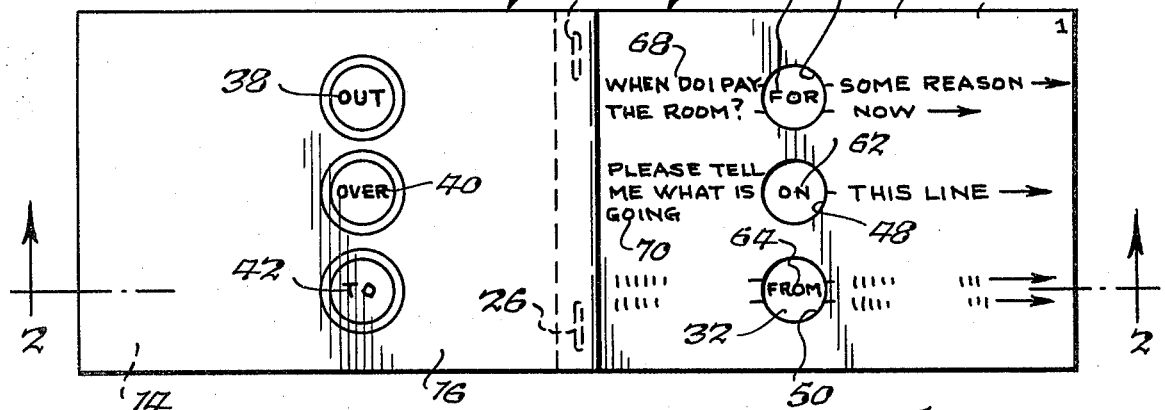
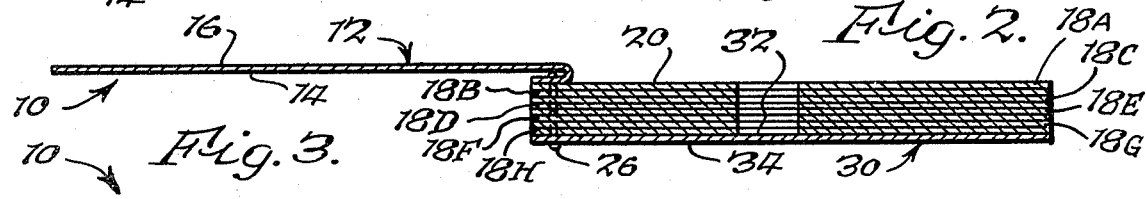
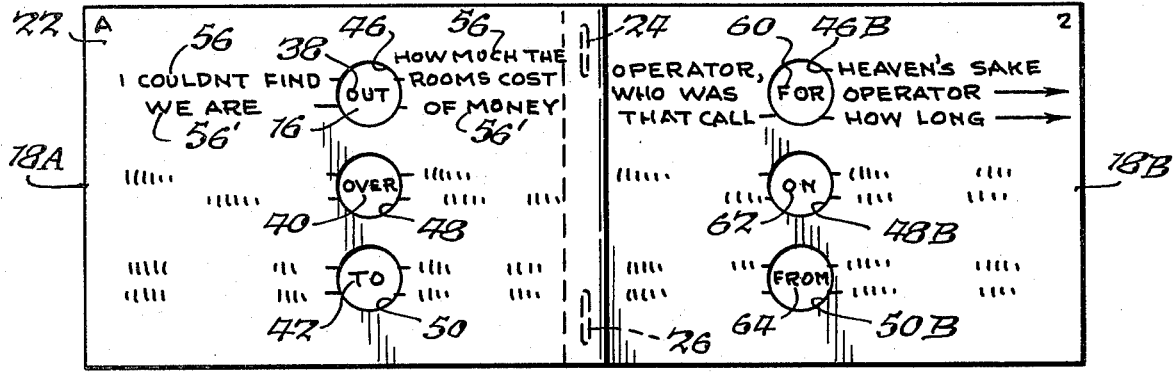
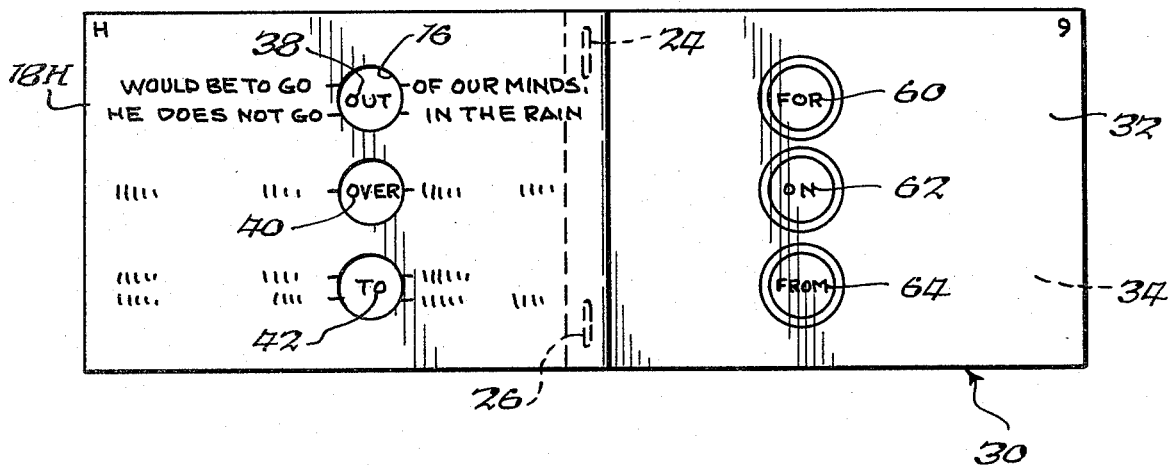

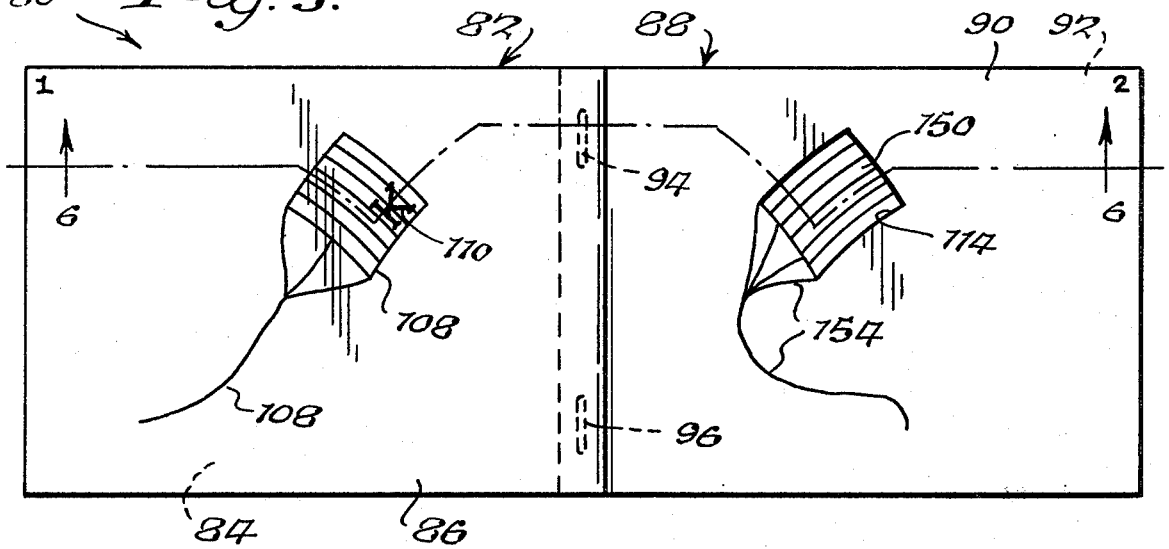
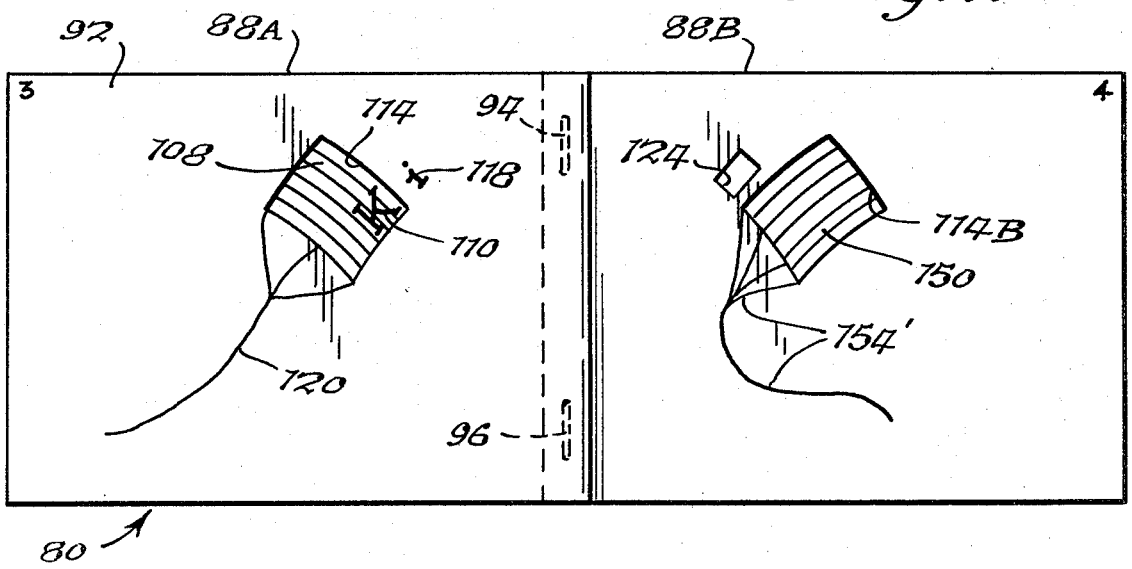

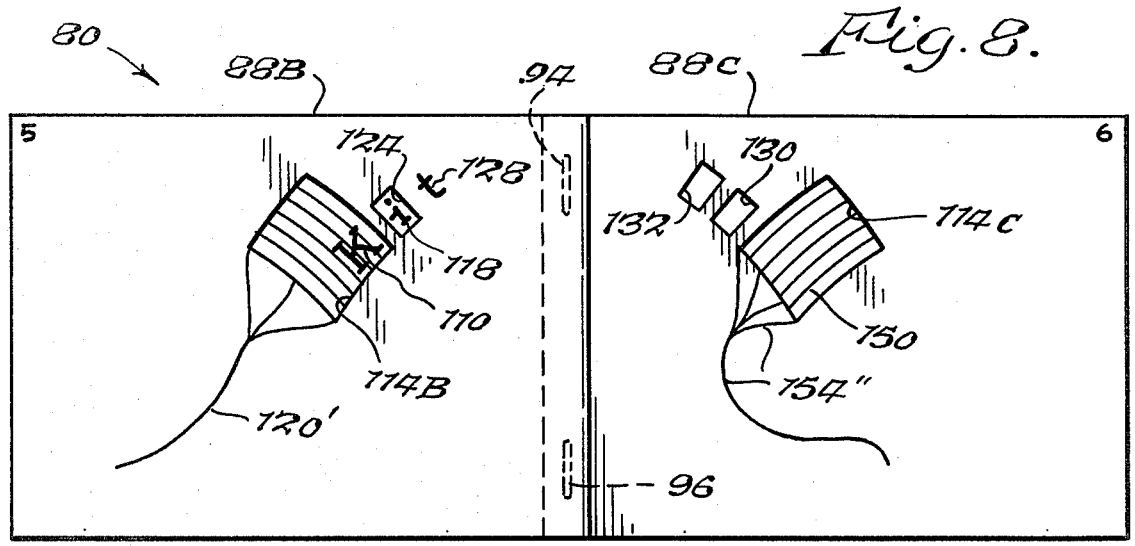
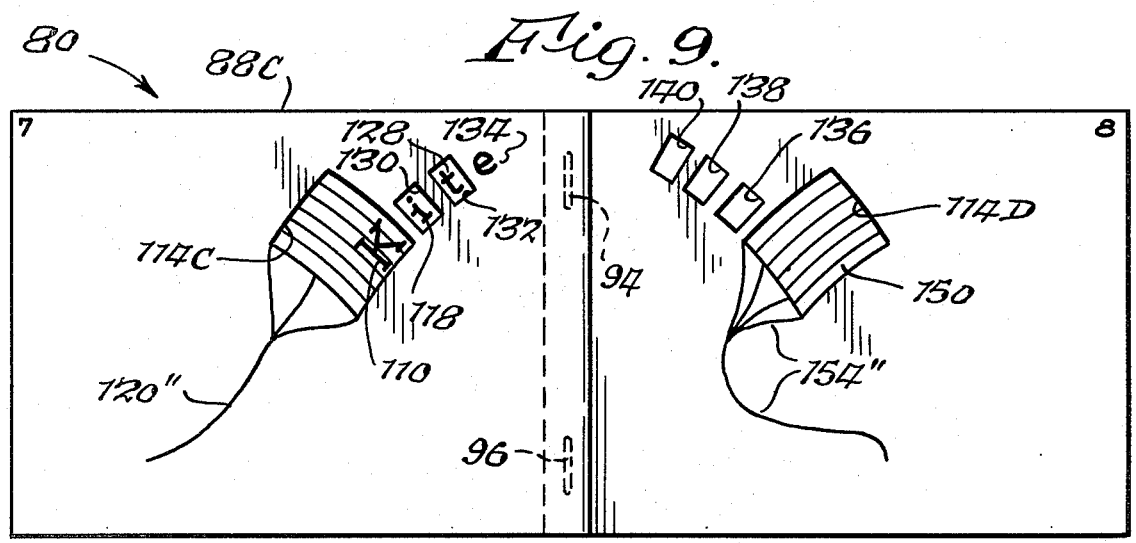
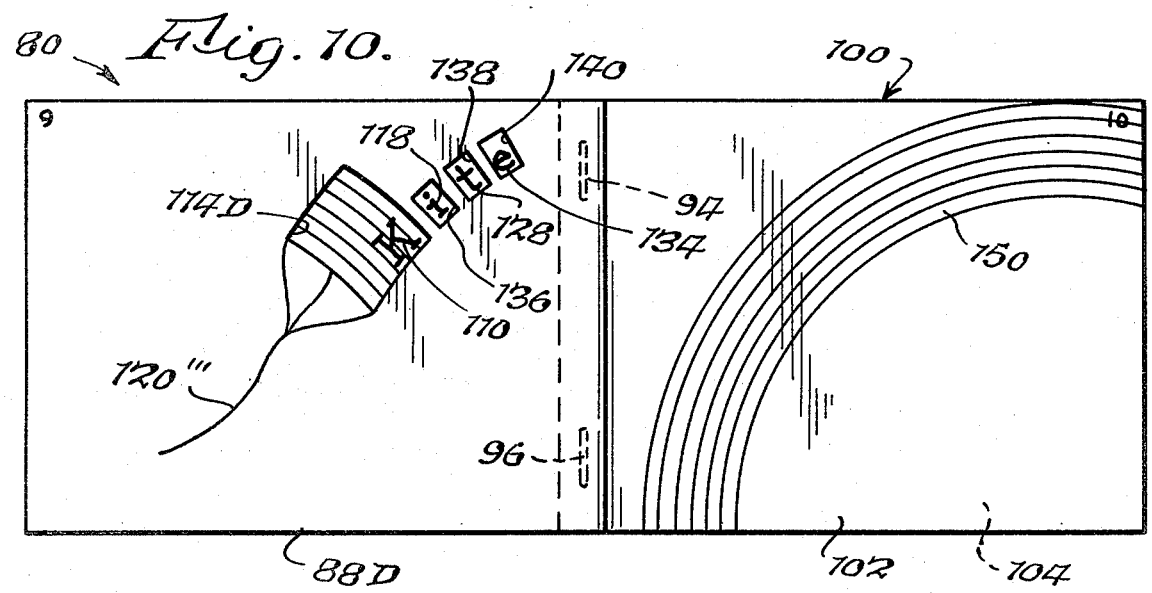

ART AND EDUCATIONAL BOOK

BACKGROUND OF THE INVENTION

This invention relates to the art of book construction, and more particularly to a new and improved educational book.

One area of use of the present invention is in teaching language, but the principles of the present invention can be variously applied. An important consideration in the construction of educational books for teaching language and the like is easing the reader's attention to the process of reading and learning. Also, in the construction of such books it would be highly desirable to provide the reader with relatively constant and repeated contact certain basic word and pictorial units.

SUMMARY OF THE INVENTION

It is, therefore, a primary object of this invention to provide a new and improved book construction.

It is a more particular object of this invention to provide such a book construction which provides the reader with relatively constant and repeated contact with certain language units.

It is a further object of this invention to provide such a book construction which eases the reader's attention to the process of reading and learning.

It is a further object of this invention to provide such a book construction which is relatively simple in construction.

The present invention provides an art and educational book comprising a first page, at least one additional page and preferably a last page and a plurality of additional pages between the first and last pages. A component of graphical information such as a word, pictorial illustration or the like is fixed to the rear surface of the first page, and an opening is provided in the additional page of shape, size and location such that the component of graphical information is visible to the reader through the opening when the additional page is against the first page. Another component of graphical information is fixed to the rear surface of the additional page and arranged relative to the opening such that the two components are combined to convey a graphical message such as completed sentence or picture to the reader. An opening and associated graphical information component can be provided on each additional page, with the openings being in registry. In addition, a number of components of graphical information can be provided on the first page, and a corresponding plurality of openings and associated graphical information components can be provided in the additional page or pages. Also, one or more components of graphical information can be provided on the front surface of the last page located so as to be visible through the opening or openings in the additional page or pages, and graphical information components can be provided on the front surface of each additional page associated with corresponding openings so as to be combined with corresponding components on the last page. The additional pages can have additional components of graphical information and additional openings so located to combine the components sequentially as the reader moves the pages sequentially. The art and educational books are part of semiotic research where the letters or units of letters or units of sentences or pictures are combined through the openings in the pages.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is an elevational view of an educational book according to the present invention in an opened flat position showing the rear surface of the first page and the front surface of an additional page;

FIG. 2 is a sectional view taken about on line 2—2 in FIG. 1;

FIG. 3 is an elevational view of the book of FIG. 1 in a flat open position showing two additional pages;

FIG. 4 is an elevational view of the book of FIG. 1 in a flat open position showing the front surface of the last page and the rear surface of an additional page;

FIG. 5 is an elevational view of an educational book according to another embodiment of the present invention in a flat open position;

FIG. 6 is a sectional view taken about on line 6—6 of FIG. 5; and

FIG. 7-10 are elevational views of the book of FIG. 5 at sequential stages of turning of various pages thereof.

DETAILED DESCRIPTION OF THE ILLUSTRATED EMBODIMENT

FIG. 1-4 illustrate an educational book 10 according to the present invention wherein openings or holes in the intermediate pages give the reader constant and repeated contact with basic units such as prepositions on the first and last pages. The openings serve as visual cues drawing attention to the basic word units. In the educational book 10 there is both a vertical relationship as viewed in FIG. 1 with respect to the basic word units, and there is a horizontal relationship involving the units, the subject matter on the intermediate pages and the process involved in proceeding page-to-page through the book.

Referring now in detail to FIGS. 1-4, the educational book 10 according to the present invention comprises a first page 12 having front and rear surfaces 14 and 16, respectively, and at least one additional page 18 having front and rear surfaces 20 and 22, respectively. The pages 12 and 18 shown in FIG. 1 meet at a junction and are relatively movable between an open position as shown in FIG. 1 and a folded closed position in a manner which will be described in detail presently. In particular, in the book shown the pages 12 and 18 are rectangular in shape and each has one edge along which it is joined to the other pages in a known manner for books of this general type. The pages are bound or joined at the aforementioned edges by fastening elements such a staples 24,26 indicated in FIG. 1. The pages of the book of course can be bound in various other ways which are well known in the art.

The educational book 10 of the present invention preferably includes a plurality of additional pages 18, and in the illustrative book shown in FIGS. 1-4 there are a total of eight additional pages which for convenience in illustration also can be designated 18A-18H. The exact number of additional pages 18 in a particular book is the choice of the author, depending upon the subject matter.

The book 10 further comprises a last page generally designated 30 in FIG. 2 and having front and rear surfaces 32 and 34, respectively. The first page 12, additional pages 18 and last page 30 are joined or bound together along common edges of the rectangular pages by the fasteners 24,26 or other suitable means thereby defining a junction adjacent the common bound edges thereof. The rectangular shape and size of the pages is merely illustrative, it being understood that they could be of square shape, for example, or of any other desired shape and size.

The book 10 according to the present invention also includes a component or portion of graphical information fixed to the rear surface of the first page 12 thereof. The term graphical information is intended to include words, phrases, sentences, numbers, pictorial illustrations and the like and components thereof, all of which convey a visible graphical message to the reader in terms of information and/or visual impressions. In the book shown, there are three components of graphical information designated 38,40 and 42 in spaced relation on surface 16 of page 12. The components 38,40 and 42 comprise printed matter components in the form of the prepositional words "out," "over," and "to" in the book illustrated herein. Other different words can of course be employed. The words can be printed or otherwise suitably applied to surface 16 in any appropriate manner. Optionally, each word can be enclosed within two concentric circles or bands forming an outline or border for purposes of design or appearance as shown in FIG. 1. In addition, the components 38,40 and 42 are somewhat elongated, each being disposed along a line substantially parallel to an imaginary line passing through both eyes of the reader. In other words, the components 38,40 and 42 are disposed horizontally during reading of the book 10 as viewed in FIG. 1. In addition, the components 38,40 and 42 are in spaced relation along a direction generally perpendicular to the aforementioned line passing through the eyes of the reader, and this direction is substantially midway between the opposite end edges of the page 12 all for a purpose to be described. In other words, the components are spaced along a vertical path during reading of the book as viewed in FIG. 1.

The book 10 according to the present invention further comprises an opening designated 46 in the additional page 18. In the book shown opening 46 is generally circular in shape but other shapes and sizes can be employed. Opening 46 is located on page 18 so that when the pages are in a folded closed position, i.e. with the front surface 20 of page 18 adjacent or in contact with the rear surface 16 of first page 12, the component of graphical information on the first page 12 is visible to the reader through opening 46. As shown in more detail in FIG. 3, page 18 is in the folded closed position with surface 20 thereof closely adjacent or contacting surface 16 of page 12. The component of graphical information 38 on page 12 is visible to the reader through the opening 46 in page 18. The book 10 of the present illustration preferably includes a plurality of openings 46,48 and 50 on the additional pages 18 and positioned thereon so that when page 18 is moved to the folded closed position illustrated further in FIG. 3, the components of graphical information 38,40 and 42 are visible to the reader through the openings 46,48 and 50 respectively. In the book shown, the openings 46,48 and 50 are of generally the same shape and size, i.e. each opening is generally circular and of the same size as the other openings. Alternatively, if desired the openings can be of different shapes and sizes, respectively, so long as the corresponding components of graphical information of surface 16 of the first page 12 are visible through the corresponding openings. In other words, the size of each opening and the measured distance between the opening and the various edges of the page 18 are determined by the corresponding size of the component of graphical information on page 12 and the location of the component of graphical information on page 12, i.e. the distance between the component and the various edges of the page 12.

The educational book 10 according to the present invention further comprises another component of graphical information fixed to a surface of the additional page 18. In particular, and referring to FIG. 3, a component of graphical information designated 56 is on the rear surface 22 of the additional page 18. The component 56 is in the form of printed matter components or a group words as shown. In addition, the component is arranged relative to opening 46 such that the component of graphical information 38 on the first page and the component of graphical information 56 on the additional page are combined to convey a graphical message to the reader. This message is in the form of a completed sentence which is formed by the combination of the components 56 and 38 when the pages 18 and 12 are in the closed position as illustrated in FIG. 3. Thus, the components of graphical information combine to form the sentence "I couldn't find out how much the rooms cost." In this particular example the opening 46 is located in the middle of the group of words forming the component of graphical information 56 so that the other component 38 is presented in a manner completing the message, in this example a completed sentence. Another component of graphical information conveying a different message can be associated with the same opening 46 as shown in FIG. 3. This component 56' when combined with the same component 38 forms the different sentence "We are out of money."

Additional components of graphical information can be provided on surface 22 of page 18 associated with either or both of the other openings 48 and 50 to combine with the components 40 and 42 which are visible through the opening to convey messages to a reader in a similar manner. For convenience in illustration, these components simply are represented by ditto marks on opposite sides of each of the openings.

The educational book 10 of the present invention further comprises a component of graphical information fixed to the front surface of the last page and located so as to be visible through the opening in the additional page when these two pages are adjacent. In particular, and referring to FIG. 4, a component 60 comprising printed matter in the form of a prepositional word is fixed to surface 32 of the last page 30. The component 60 can be printed or otherwise applied to surface 32 in a manner similar to that of components 38,40 and 42 on the first page 12. Optionally, component 60 can be bounded by a pair of closely spaced concentric circles or bands for purposes of ornamentation as shown in FIG. 4. Component 60 is located on surface 32 of page 30 such that when an additional page, for example page 18H, is adjacent the page 30 with the rear surface of the additional page being closely adjacent or in contact with the front surface 32 of the last page 30, the component 60 is visible to the reader through the opening 46. In the book of the present illustration there are three components of graphical information 60,62 and 64 on surface 32 of page 30 as shown in FIG. 4. Each of the components 60,62 and 64 is somewhat elongated and disposed along a line generally parallel to an imaginary line intersecting the eyes of the reader, i.e. each is disposed generally horizontally. In addition, the components 60,62 and 64 are spaced apart in a direction and are located along this direction which is generally perpendicular to the aforementioned line passing through the eyes of the reader, i.e. in a generally vertical direction. The size and location considerations relative to components 60,62 and 64 are the same as those described in connection with components 38,40 and 42.

The book of the present invention preferably includes a plurality of additional pages 18 each having openings 46,48 and 50 in registry or alignment. Thus, as shown in FIGS. 1 and 2, when all of the additional pages 18 are in closely-stacked or packed relation against the last page 30, the graphical information components 60,62 and 64 on the last page are visible to the reader through the openings 46,48 and 50, respectively, as shown in FIG. 1. Of course, if the stack of pages 18 shown in FIGS. 1 and 2 were moved or flipped so as to cover the first page 12, then the components 38,40 and 42 thereon likewise would be visible to the reader through openings 46,48 and 50, respectively.

The book of the present invention further comprises a component of graphical information fixed to the front surface of the additional page 18 thereof. In particular, the component 68 as shown in FIG. 1 comprises a group of words adjacent one side of the opening 46. When the group of words 68 on page 18 are combined with the single word or component 60 visible through opening 46, a graphical message is conveyed to the reader in the form of the completed sentence "When do I pay for the room?." In this situation, as compared to that of the preceding illustration, the component 68 is entirely on one side of the opening 46 as opposed to straddling the opening 46, i.e. having the opening intermediate the ends of the component. Various other spatial arrangements can of course be employed. Another component 70 on page 18 is associated with opening 48 in a similar manner, and when combined with the component 62 visible through opening 48 forms the completed sentence "Please tell me what is going on." Various other arrangements of graphical information can be employed. For example, as shown in FIGS. 1 and 3, the surface 20 of page 18 also can include the first word or words of a sentence which is then completed on the opposite side 22 thereof, the arrows near the edge of surface 20 indicating the need to turn the page to complete the sentence.

The openings or holes 46,48 and 50 in the additional or intermediate pages 18 give the reader constant and repeated contact with the basic units or components of graphical information 38,40 and 42 on the first page 12 and components 60,62 and 64 on the last page. The openings serve as visual cues drawing the reader's attention to the basic units, in the present illustration of prepositional words.

The components of graphical information on the first and last pages of the book 10 can be prepositions and/or verbs which are combined with graphical information on the additional pages, i.e. used in sentences to context of which gives clues to help the student infer the meanings of the prepositions and/or verbs before having to look up the meanings. Alternatively, the graphical information components could be nouns and/or adjectives.

Thus, each of the additional or intermediate pages 18 can contain commonly used idiomatic expressions, prepositional phrases, figures of speech and the like, and the prepositions, verbs or the like on the first and last pages, visible through the openings or holes, serve as the focal words.

The book 10 of the present invention thus gives the reader constant and repeated contact with the integral unit of the idiom because the holes or openings are visual cues which draw attention to it. This visual image of the idiom/expression can be more easily memorized in the context in which it appears. Hence, by virtue of the book construction of the present invention there is a immediate structuring of the hierarchy of attention on an optical level. In addition, the continuity of the holes or openings strengthens the process of perception and grasps the reader's attention not only through content but also through preparing the moment of readiness to grasp the meaning. In other words, through optical stimuli, the reader is made to grasp the meaning later.

There is a vertical relationship among the components 38,40 and 42 on page 12 and among components 60,62 and 64 on page 18 as viewed in FIG. 1. These components in effect provide vertical constant messages building a linear action which is abstract in the sense that it does not tell a story. The linearity here is the constancy, achieved through repetition of the components. There is a horizontal relationship between the components of graphical information on the first or last pages and the additional pages, and this continues as the reader turns the pages. There is also a linear action in this horizontal relationship. The holes or openings cooperate in both the vertical and horizontal relationships.

FIGS. 5-10 illustrate an educational book 80 according to another embodiment of the present invention. The book 80 comprises a first page 82 having front and rear surfaces 84 and 86, respectively, and at least one additional page 88 having front and rear surface 90 and 92 respectively. The pages 82 and 88 shown in FIG. 5 meet at a junction and are relatively movable between an open position as shown in FIG. 5 and a folded closed position in a manner similar to that of the preceding embodiment. The pages 82 and 88 are rectangular in shape each having one edge along which it is joined to the other pages in a known manner for books of this general type. As in the preceding embodiment, the pages are bound or joined at the aforementioned edges by fastening elements such as staples 94,96 indicated in FIG. 5, and alternatively the pages can be bound in various other ways all well known in the art.

The educational book 80 of this embodiment preferably includes a plurality of additional pages 88, and in the illustrative book shown there are a total of four additional pages which for convenience in illustration also are designated 88A-88D. The particular number of additional pages in a given book is determined by a number of factors, one obviously being the subject matter included therein. The book 80 further comprises a last page generally designated 100 having front and rear surfaces 102 and 104, respectively. The first page 82, additional pages 88 and last page 100 are joined or bound together along the common edges of the rectangular pages by the fasteners 94,96 or the equivalent thereby defining a junction adjacent the common bound edges thereof. As in the preceding embodiment, the rectangular shape and size of the pages is merely illustrative, it being understood that they could be of square shape or any other desired shape and sizes.

The book 80 according to this embodiment includes a component or portion of graphical information 108 fixed to the rear surface 86 of the first page 82. The term graphical information used herein has the same meaning as that term used in connection with the book of the first embodiment of the present invention. In the book shown in FIGS. 5–10, the component 108 of graphical information applied or fixed to surface 86 is a drawing or pictorial illustration of a kite including the outline of the kite body, a portion of the kite string, and a plurality of bands extending laterally across the body of the kite which can be of various colors to enhance the visual impression thereof. Also in the book shown there is another component of graphical information 110 in the form of the letter "K" which is located within the body of the kite illustration for a purpose to be described. Various other types of graphical information can be applied to surface 86 of page 82 if desired.

The book 80 according to the present invention further comprises an opening 114 in the additional page 88. In the book shown opening 114 is generally rectangular in shape, with some of the edges being slightly curved as shown in FIG. 5, so that the opening 114 has a shape which coincides with the portion of the component of graphical information 108, i.e. the body of the kite but not the string. Opening 114 is located on page 88 so that when the pages are in a folded closed position, i.e. with the front surface 90 of page 88 adjacent or in contact with the rear surface 86 of the first page 82, the component of graphical information on the first page is visible through the opening 114. Referring to FIG. 7, page 88A is in the folded closed position with surface 90 thereof closely adjacent or contacting surface 86 of the first page 82. The component of graphical information 108, in particular the body of the kite, is visible to the reader through the opening 114 in page 88. The size of the opening 114 and the measured distance between the opening and the various edges of the page 88 are determined by the size of the component of graphical information on page 82 and the distance from the component to the various edges of the page 82.

The educational book 80 according to this embodiment of the present invention further comprises at least one other component of graphical information fixed to a surface of the additional page 88. In particular, as shown in FIG. 7 one component of graphical information designated 118 is on the rear surface 92 of the additional page 88A. The component 118 is in the form of a printed matter unit, in particular the letter "i." In addition, this component is arranged relative to the opening 114 in page 88 so that the components of graphical information 110 and 118 are combined to convey a graphical message to the reader. This particular message is in the form of two components which will be sequentially combined with others in a manner to be described. Another component of graphical information 120 is applied to surface 92 and is in the form of a pictorial illustration or drawing of a kite string identical to that applied to surface 86 of page 82. This is located on surface 92 so as to extend from the illustration 108 of the body of the kite which is visible through the opening 114 as shown in FIG. 7.

The additional page 88B has an additional opening 124 therein so positioned that when page 88B is adjacent page 88A as shown in FIG. 8, the component 118 is visible through opening 124. Components 108 and 110 are visible through opening 114B, the openings 124 and 114B being out of registry. Another component 128 of graphical information is fixed to the rear surface of page 88B and is in the form of the letter "t." The additional page 88C has additional openings 130 and 132 therein so located that when page 88C is adjacent the neighboring page 88B as shown in FIG. 9, the components 118 and 128 are visible through the openings 130 and 132, respectively. Components 108 and 110 are visible through opening 114C which is in registry with the other openings 114. Openings 130 and 132 are out of registry with openings 114, and openings 130 and 124 are in registry. Another component 134 of graphical information is on the rear surface of page 88C and is in the form of the letter "e."

The additional page 88D has additional openings 136, 138 and 140 therein so located that when page 88D is adjacent the neighboring page 88C, the components 118, 128 and 134 are visible to the reader through the openings 136, 138 and 140, respectively, as shown in FIG. 10. Components 108 and 110 are visible through opening 114D, the openings 136, 138 and 140 being out of registry with opening 114D. Openings 124, 130 and 136 are in registry, and openings 132 and 138 are in registry.

A component 150 of graphical information is applied to surface 102 of last page 100. Component 150 in the present illustration is an accurate body in the form of a plurality of bands colored to represent pictorially a rainbow. A portion of component 150 is visible to the reader through openings 114 when any or all of the additional pages are positioned against the last page as shown in FIGS. 5–9. Each of the additional pages 88 has a component of graphical information 154 on the front surface thereof and associated with opening 114. The components are a pictorial illustration of a kite string which combine with the illustration 150 visible through opening 114 to represent an entire kite.

Thus, as the additional pages 88 are moved sequentially together from the arrangement shown in FIG. 5 to that shown in FIG. 10, the additional components 110, 118, 128 and 134 are sequentially visible to the reader through the openings and combine sequentially to convey a graphical message to the reader, in the present illustration the word "Kite." This is in addition to the graphical message formed by components 108 and 120, i.e. the pictorial illustration of a kite.

It is therefore apparent that the present invention accomplishes its intended objects. While several embodiments of the present invention have been described in detail, this is for the purpose of illustration, not limitation.

What is claimed is:

1. A book comprising:
(a) a first page having front and rear surfaces, a last page having front and rear surfaces, and at least one additional page having front and rear surfaces, said pages meeting at a junction and being relatively movable about said junction;
(b) a component of graphical information in the form of a word on said back surface of said first page and another component of graphical information in the form of a word on said front surface of said last page;
(c) an opening in said additional page and located thereon such that when said additional page is moved to a position where said front surface of said additional page is adjacent said rear surface of said first page said word on said first page is visible through said opening and when said additional page is moved to a position where said rear surface of said additional page is adjacent said front surface of said last page said word on said last page is visible through said opening;

(d) components of graphical information in the form of groups of words on said front and rear surfaces of said additional page, said groups of words being arranged on said additional page relative to said opening such that when said additional page is moved to positions adjacent either said first or last pages said groups of words on said front or rear surfaces of said additional page are combined with either said words on said last or first pages, respectively, to convey graphical messages to the reader formed by the combination of said words and said groups of words;

(e) a plurality of additional components of graphical information in the form of words on said first and last pages, a corresponding plurality of openings on said additional page, said words being located on said back surface of said first page and on said front surface of said last page and said openings being located on said additional page such that when said pages are in said closed position said words are visible through corresponding ones of said openings, and a plurality of other components of graphical information in the form of groups of words on said front and back surfaces of said additional page, said other groups of words being arranged relative to corresponding ones of said openings such that said words on said first and last pages and said groups of words on said additional pages associated with each of said openings are combined to convey a graphical message to the reader formed by the combination of said words and said groups of words;

(f) said words on said first and last pages being spaced apart along a direction disposed generally perpendicular to a line intersecting both eyes of the reader and said groups of words on said additional pages being disposed along a line generally parallel to a line intersecting both eyes of reader, said groups being spaced along a direction generally perpendicular to said line intersecting the eyes of the reader;

(g) a plurality of said additional pages each having a plurality of said openings therein, said openings on each of said additional pages being in registry with corresponding openings in the other of said additional pages so that said words on said first and last pages are visible through all of said openings when said additional pages are moved to positions adjacent said first or last pages; and (h) components of graphical information in the form of groups of words on said front and rear surfaces of each of said additional pages, said groups of words being arranged on each additional page relative to said openings therein such that when each additional page is moved to positions toward either said first or last pages said groups of words on said front and rear surfaces of each additional page are combined with either of said words on said last or first pages, respectively, to convey graphical messages to the reader formed by the combinations of said words and said groups of words, said groups of words on said additional pages being disposed along a line generally parallel to a line intersecting both eyes of the reader, said groups being spaced along a direction generally perpendicular to said line intersecting the eyes of the reader.

2. A book comprising:

(a) a first page having front and rear surfaces, a last page having front and rear surfaces, and at least one additional page having front and rear surfaces, said pages meeting at a junction and being relatively movable about said junction;

(b) a component of graphical information on said back surface of said first page and another component of graphical information on said front surface of said last page;

(c) an opening in said additional page and located thereon such that when said additional page is moved to a position where said front surface of said additional page is adjacent said rear surface of said first page said component of graphical information on said first page is visible through said opening and when said additional page is moved to a position where said rear surface of said additional page is adjacent said front surface of said last page said component of graphical information on said last page is visible through said opening;

(d) components of graphical information on said front and rear surfaces of said additional page, said components of graphical information being arranged on said additional page relative to said opening such that when said additional page is moved to positions adjacent either said first or last pages said components of graphical information on said front or rear surfaces of said additional page are combined with either said components or graphical information on said last or first pages, respectively, to convey graphical messages to the reader formed by the combination of said components of graphical information;

(e) a plurality of said additional pages each having an opening therein, said openings being in registry so that said components of graphical information on said first and last pages are visible through all of said openings when said additional pages are moved to positions adjacent said first or last pages;

(f) components of graphical information on said front and rear surfaces of each of said additional pages, said components of graphical information being arranged on each additional page relative to said opening therein such that when each additional page is moved to positions toward either said first or last pages said components of graphical information on said front and rear surfaces of each additional page are combined with either said components of graphical information on said last or first pages, respectively, to convey graphical messages to the reader formed by the combinations of said components of graphical information;

(g) an additional component of graphical information on at least one of said additional pages on at least one surface thereof and another opening on the neighboring one of said additional pages arranged so that when said one additional page and said neighboring additional page are moved together to a closed position said additional component of graphical information is visible through said other opening;

(h) each of said additional pages having a plurality of openings therein, the number of openings progressively changing by one from page-to-page, one of said openings being out of registry with any openings on the preceding page and the remaining openings being in registry with corresponding openings in the preceding page, the preceding page having graphical information arranged so as to be visible through said one opening and said graphical information being visible also through the other pages; and (i) said graphical information components and said openings being arranged so that upon sequential moving together of said pages said additional components are sequentially visible to the reader through the progressively changing number of openings and combine sequentially to convey another graphical message to the reader formed by the combination of said additional components.

* * * * *